United States Patent
Lee et al.

(10) Patent No.: US 8,554,927 B2
(45) Date of Patent: Oct. 8, 2013

(54) METHOD FOR SHARING RIGHTS OBJECT IN DIGITAL RIGHTS MANAGEMENT AND DEVICE AND SYSTEM THEREOF

(75) Inventors: Seung-Jae Lee, Seoul (KR); Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1231 days.

(21) Appl. No.: 11/545,543

(22) Filed: Oct. 11, 2006

(65) Prior Publication Data
US 2008/0010457 A1  Jan. 10, 2008

Related U.S. Application Data

(60) Provisional application No. 60/724,906, filed on Oct. 11, 2005.

(30) Foreign Application Priority Data

Jun. 23, 2006  (KR) .......................... 10-2006-0057141

(51) Int. Cl.
*G06F 15/16* (2006.01)

(52) U.S. Cl.
USPC .......................................................... 709/228

(58) Field of Classification Search
USPC .......................................................... 709/228
See application file for complete search history.

(56) References Cited

U.S. PATENT DOCUMENTS

| | | |
|---|---|---|
| 2004/0115530 A1 | 6/2004 | Maeda et al. |
| 2004/0148503 A1* | 7/2004 | Sidman .......................... 713/167 |
| 2005/0044361 A1* | 2/2005 | Chang et al. ................... 713/167 |
| 2005/0132207 A1 | 6/2005 | Mourad |
| 2005/0210236 A1 | 9/2005 | Lee et al. |
| 2005/0210249 A1* | 9/2005 | Lee et al. ....................... 713/168 |

FOREIGN PATENT DOCUMENTS

| | | |
|---|---|---|
| CN | 1503994 A | 6/2004 |
| WO | WO 2005/041001 A1 | 5/2005 |

* cited by examiner

*Primary Examiner* — Thomas Tarcza
*Assistant Examiner* — Maceeh Anwari
(74) *Attorney, Agent, or Firm* — Birch, Stewart, Kolasch & Birch, LLP

(57) ABSTRACT

A method for sharing Rights Object (RO) of a specific DRM content resident in a certain device with different devices (or terminals) in a Digital Rights Management (DRM) system, in which a first device and a second device can share an RO for DRM content by performing a mutual authentication between the first device and the second device to set a session therebetween; creating, by the first device, a second RO for the second device; and transferring the second RO from the first device to the second device through a particular interface. Thereby, while the first device consumes a specific DRM content with employing the first RO, the second device simultaneously consumes the specific DRM content with the second RO transferred from the first device.

19 Claims, 7 Drawing Sheets

FIG. 3A

<!ELEMENT permission (constraint?, asset*, play?, display?, execute?, print?, export?, temporary-share?)>

FIG. 3B

<!ELEMENT temporary-share (constraint?, permission?)>
<!ATTLIST temporary-share concurrent CDATA #IMPLIED>
<!ATTLIST temporary-share hostdevID CDATA #IMPLIED>

FIG. 4A

```
<!ELEMENT constraint (count?, datetime?, interval?, accumulated?, individual?, system*,
network-connectivity?)>
```

FIG. 4B

```
<!ELEMENT network-connectivity EMPTY>
<!ATTLIST network-connectivity errcount CDATA #IMPLIED>
<!ATTLIST network-connectivity hostaddr CDATA #IMPLIED>
<!ATTLIST network-connectivity period CDATA #IMPLIED>
```

METHOD FOR SHARING RIGHTS OBJECT IN DIGITAL RIGHTS MANAGEMENT AND DEVICE AND SYSTEM THEREOF

TECHNICAL FIELD

The present invention relates to a digital rights management (DRM), and more particularly to a method for temporarily sharing a rights object (RO) for a specific DRM content resident in a certain device together with different devices, and a device and system thereof.

BACKGROUND ART

A Digital Rights Management (DRM) refers to a system technology for safely protecting a right for digital contents and systematically managing it. The DRM provides a protecting and managing scheme for preventing an illegal copy of the content, acquiring DRM contents RO, and creating and transferring the content.

FIG. 1 illustrates a construction of a DRM system. The DRM system controls content issued to a user by a content provider to be consumed only in a right-limit of RO. Here, the content provider refers to an entity corresponding to a Content Issuer (CI) and/or a Rights Issuer (RI).

The CI issues a protected content using a particular encryption key so as to protect the content from users having no access right therefor, while the RI issues RO required to consume the protected content.

A DRM agent is mounted in a terminal thus to receive the protected content and the RO. The DRM agent then analyzes 'permission' and/or 'constraint' included in the RO and thus changes the protected content into a format which is usable in the corresponding terminal, thereby controlling the use of the content. Here, the RO for the DRM content may include various types of constraints which is employed when consuming the corresponding DRM content and examples of types of constraints, related to consuming the corresponding DRM content, is given as follows: 'count'; 'interval'; or 'system'.

Meanwhile, there may be a case that a certain terminal to which RO for a specific DRM content has been issued employs the RO issued and simultaneously desires to temporarily share the RO together with a plurality of unspecified devices or different (other) devices all of which belong to a certain domain.

DISCLOSURE OF THE INVENTION

Therefore, it is an object of the present invention to provide a method for temporarily sharing (or 'Ad Hoc sharing' called) RO for DRM content possessed by a particular device with at least one or more different devices.

To achieve these objects, there is provided a method for sharing RO for DRM content comprising: performing a mutual authentication between a first device and a second device to set a session therebetween; creating, by the first device, a second RO for the second device; and transferring the second RO from the first device to the second device through a particular interface. Thereby, while the first device consumes a specific DRM content with employing the first RO, the second device simultaneously consumes the specific DRM content with the second RO transferred from the first device.

According to another embodiment of the present invention, there is provided a method for sharing RO for DRM content comprising: receiving, by a first device, a first Rights Object (RO) issued from a Rights Issuer (RI) or another device; processing the first RO into a second RO by the first device; and transferring the second RO from the first device to one or more second devices.

Preferably, the second device executes notifying of an expiration of the second RO to the first device and canceling (deleting) of the second RO, upon the expiration of the second RO.

According to still another embodiment of the present invention, there is provided a method for sharing RO for DRM content comprising: transferring RO from a first device to one or more second devices, wherein the RO is created by a Rights Issuer (RI) or the first device to include one of a temporary-share permission and a network-connectivity constraint; and sharing the RO in the first device and the at least one or more second devices.

According to yet another embodiment of the present invention, there is provided a method for sharing RO for DRM content comprising: receiving, by a first device, a first RO from an RI or another device; and checking, by a second device, whether the first device has a right of modifying (changing or creating) the first RO.

To achieve these objects, there is provided a device for DRM content is embodied such that the device processes RO issued from a Rights Issuer (RI), and transfers the processed RO to at least one or more different devices thus to share the RO with the one or more different devices.

BRIEF DESCRIPTION OF THE DRAWINGS

FIG. 3A is a view showing an XML format of RO containing a temporary-share permission.

FIG. 3B is an XML format of RO containing a temporary-share permission which has a sub-element.

FIG. 4A is an XML format of RO containing a network-connectivity constraint.

FIG. 4B is an XML format of RO containing a network-connectivity constraint which has a sub-element.

MODES FOR CARRYING OUT THE PREFERRED EMBODIMENTS

The present invention may conceptually be embodied such that Rights Object (RO) possessed by a particular device can be transferred to at least one or more other devices which desire to temporarily share the RO for use, by including a specific constraint or the like for a temporary-share in the RO transferred. Here, the particular device receives RO issued from a Rights Issuer (RI) (or another device) and processes or changes the RO in order to share it with one or more other devices. The particular device may then transfer the processed RO to the one or more other devices. The particular device, on the other hand, can obtain RO issued from the RI, the RO having processed to include a specific constraint for a temporary-share, so as to transfer the RO to one or more other devices.

Hereinafter, construction and operation of embodiments of the present invention will be explained with reference to the drawings. Meanwhile, a term "content" described in the present invention is, for example, generally called a protected content which denotes digital contents such as DRM contents. Also, a term "device" described in the present invention refers to every device to which a DRM can be applied. That is, the device may include not only mobile communications terminals to which the DRM is applicable but also all electrical home appliances to which the DRM is applicable (e.g., TVs or refrigerators, laptop computers, PDAs, game machines, etc)

Figure 1:
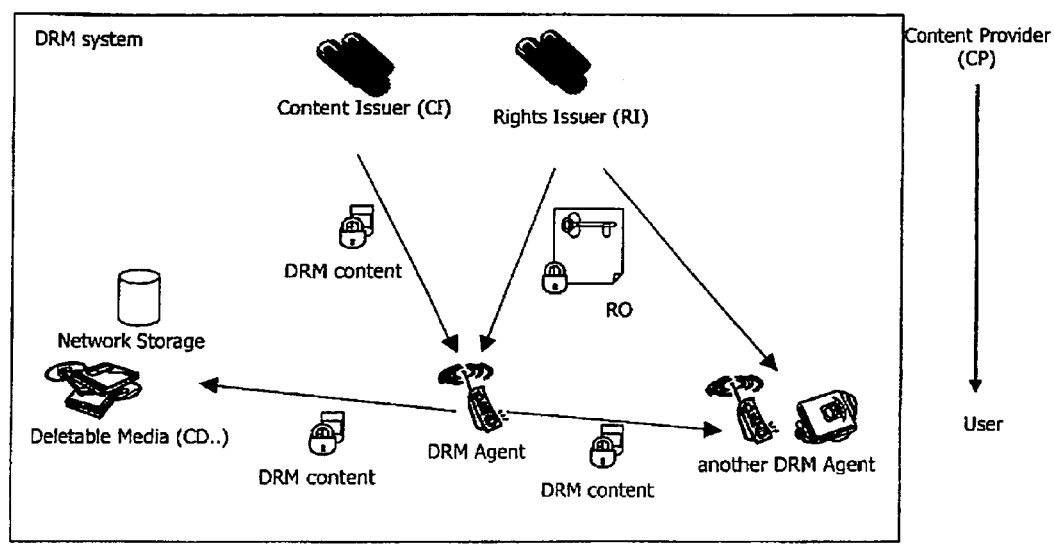
FIG. 1 is an architecture showing a Digital Rights Management (DRM) system according to the related art.
Figure 2:
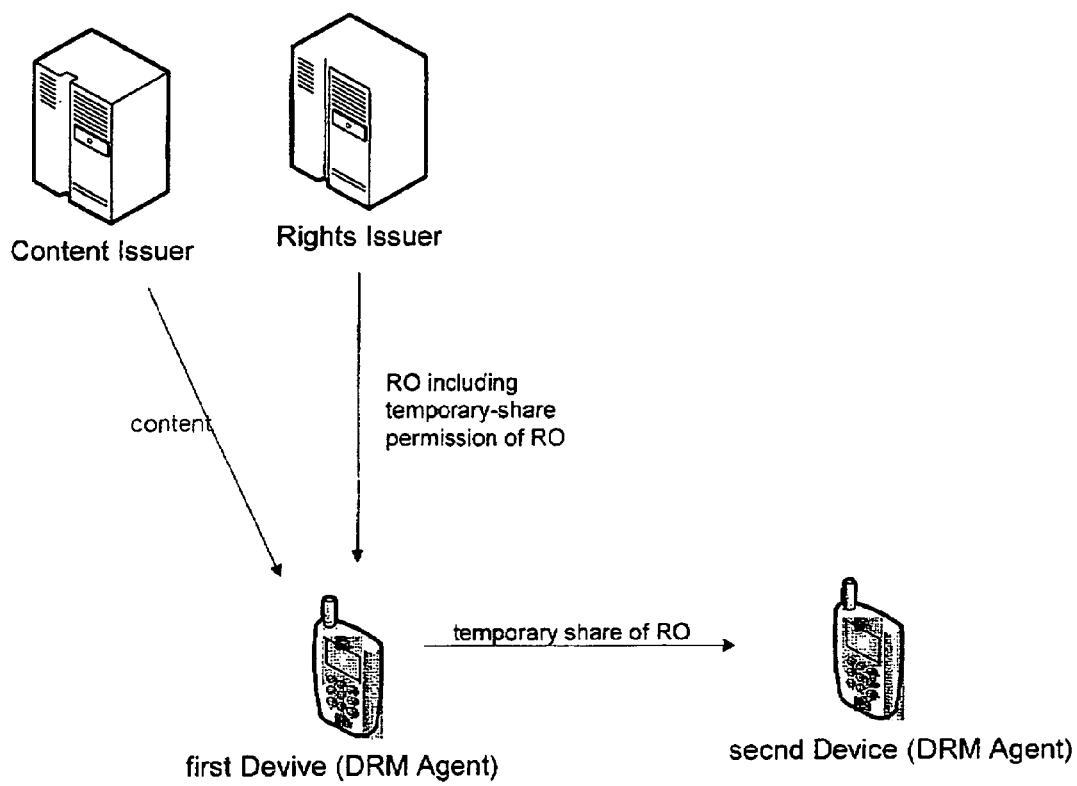
FIG. 2 is a schematic architecture showing a DRM system related to a temporary sharing of RO for a DRM content in accordance with an embodiment of the present invention.

FIG. 2 is an architecture schematically illustrating a DRM system for a temporary-share of DRM content. For facilitating an explanation of the present invention, a first device DRM agent and a second device DRM agent shown in FIG. 2 are referred to as a first device and a second device, respectively. Also, though there has shown only one second device for a simple explanation in FIG. 2, it is assumed in the present invention that one or more second devices may be used.

In the embodiment of the present invention shown in FIG. 2, a DRM system according to the present invention may roughly perform two different operations, namely, a first operation performed between a first device and RI and CI, and a second operation performed between the first device and a second device.

Regarding the first operation, a Content Issuer (CI) issues DRM content to the first device (i.e., a first device DRM agent), and a RI issues RO with respect to the DRM content. The issued RO may include permission (or a permission operation) for a temporary-share.

Regarding the second operation, the first device having received the RO which includes the temporary-share permission can transfer to the second device (i.e., a plurality of second devices) a specific DRM content and a temporary-share RO for consuming the specific DRM content. Here, the first device performs a super-distribution to the second device (i.e., a second device DRM agent) in order to distribute the specific DRM content thereto. The second device can receive the specific DRM content from a different entity (e.g., the CI) prior to or after receiving the temporary-share RO from the first device.

Thus, in order to temporarily share the RO for the specific DRM content between the first and second devices, the first device needs to get a temporary-share permission for the RO from the RI, and a certain constraint is required to allow the second device to employ (temporarily share) the RO transferred from the first device.

Hereinafter, a format of RO issued from the RI to the first device DRM agent will be explained.

The RI transfers to the first device a permission for a temporary-share, namely, the permission meaning of capability in which the first device can deliver a temporary-share RO for a specific DRM content to one or more different devices (i.e., a plurality of second devices). The temporary-share permission may be transferred to the first device by being included in the RO issued by the RI. Alternatively, the temporary-share permission may be formed in a certain data format (e.g., as a certain packet) separately from the RO to thereafter be transferred to the first device from the RI. Here, the "temporary-share" permission corresponds to a parameter or an element transferred together with the RO issued from the RI. Furthermore, the RO, including the temporary-share permission, may be alternatively issued (or transferred) from another device, rather than the RI, to the first device. For simply and easily explaining the present invention, it is assumed in the present invention that the RO, including the temporary-share permission, may be issued from the RI only.

Hereinafter, the temporary-share related parameter or element will be explained in more detail.

FIG. 3A illustrates an XML ((exTensible Markup Language) format for specifying a structure of RO including a temporary-share permission among several permission elements which are included in the RO issued to the first device by the RI. FIG. 3B illustrates one or more sub-elements contained in the temporary-share permission, which shows an XML format of RO including one or more sub-elements such as.'constraint', .'permission', .'concurrent', and .'hostdevID'.

In FIG. 3B, .'constraint' element indicates an employing condition for RO to consume an DRM content therewith. The constraint, namely, the employing condition may include, for example, 'count', 'timed-out', 'datetime', 'interval', 'accumulated', 'individual', 'system', and the like.

.'permission' element indicates a permission of RO for a specific DRM content, which may, for example, include 'play' corresponding to an operation of playing a certain DRM content, 'display' corresponding to an operation of displaying a certain DRM content on a screen, 'execute' corresponding to an operation of executing a certain DRM content in the form of program, 'print' corresponding to an operation of printing a certain DRM content to an output device, 'export' corresponding to an operation of exporting a certain DRM content in another DRM technology based format, and the like.

.'concurrent' element has an attribute indicating the maximum number of second devices which can simultaneously consume temporary-share RO for a certain time. Upon designating a 'concurrent' attribute, a first device should manage the number of second devices which are sharing RO with the first device.

.'hostdevID' element may indicate an attribute for determining which device is to be a host of a temporary-share or an attribute denoting which device can modify RO, or indicate both the two attributes. Therefore, if the hostdevID denotes an ID of a first device (i.e., if a value of the hostdevID matches an ID value of the first device), only the first device can get a right of transferring RO to one or more second devices to temporarily share RO for a specific DRM content together with the one or more second devices. Alternatively, if a particular entity (e.g., the RI) transfers a certain RO to the first device, the first device should check whether its ID matches a value of the hostdevID. Here, the hostdevID denotes BASE64 Hash value of a certificate of a certain device (e.g., the first device) or a unique string.

Hereinafter, a format of RO transferred from a first device to a second device to temporarily share RO will be explained.

When a first device receives RO issued from an RI, the RO including 'constraint' and 'permission' specified in an XML format as shown in FIG. 3A and/or FIG. 3B, the first device decodes a Content Encryption Key (CEK) included in the RO. The first device leaves the RO in the CEK decoded state, encodes the RO using a public key of the second device, or encodes the RO using a sharing key of the second device. Alternatively, the first device attaches a digital signature to information related to 'permission' or 'constraint' in the RO, or attaches (adds) a value of a Message Authentication Code (MAC), the value obtained from the RO.

The first device attaches a MAC value to the RO as follows: the first device creates a MAC key with the MAC value; obtains( creates) a MAC value by using the MAC key; and then attaches the obtained MAC value into the RO issued from the RI.

Meanwhile, the first device may transfer RO, which is possessed by the first device itself, to second devices (i.e., a plurality of devices) to temporarily share it therewith. Here, the first device may transfer the RO to second devices (i.e., the plurality of devices) after processing it. Processing the RO by the first device is executed in order to temporarily share the RO with the second devices. Thus, since the first device processes the RO resident to the first device itself to thereafter transfer the processed RO to the second devices (i.e., a plurality of second devices), the first device may be referred to as a local Rights Issuer (RI).

Here, the number of devices which temporarily share the RO may be managed by a sub-element of the temporary-share permission, namely, a 'concurrent'. The first and second devices may be devices belonging to the same particular domain. If the first and second devices all belong to the same domain, the first device is not necessary to process the RO, which is possessed by the first device, in order to temporarily share it together with the second devices. If the RO is a domain RO for a certain domain, it is encoded with a domain key dedicated for the certain domain. Accordingly, the domain RO is received in the second devices from the first device to thereafter be decoded using the domain key.

In order to temporarily share the RO of the first device with the second devices, the RO transferred (or issued) from the first device to the second device may be processed (or changed or modified) by adapting two methods as follows. A first method is employed such that RO is processed (or created) by attaching (adding) a certain constraint in the RO, while a second method is employed such that RO is processed by attaching (adding) 'network connectivity' constraint in the RO. The first method is based upon a time-based constraint, and the second method is based upon a proximity-based constraint.

First, in one example using the first method, the number of times of consuming (i.e., 'count' element) may be set to a small number. That is, if the first device has processed the RO by count=1, the second device having received the processed RO from the first device can consume a certain DRM content only one time using the RO (i.e., the RO processed to set by count=1). Also, in another example using the first method, a time to use the RO is limited. That is, the RO is processed such that 'datetime' is set to as 'one hour', or 'accumulated' or 'interval' is set to as 'one hour'. Other constraints are additionally set in the RO to thereafter process the RO. Accordingly, the processed RO can temporarily be shared between the second devices and the first device. Thus, the RO processing according to the first method is referred to as 'time-based constraint'.

The second method is referred to as 'proximity-based constraint' and is implemented such that RO is processed by adding 'network connectivity' in the RO. That is, 'network connectivity' indicates a condition (i.e., a constraint) which specifies whether RO for consuming DRM content is capable of being shared according to a connected state with a certain network.

Hereinafter, the second method will be explained in more detail with reference to FIGS. 4A and 4B.

FIG. 4A illustrates an XML format defining a structure of RO including a 'network-connectivity' as an element in the RO. FIG. 4B illustrates an XML format defining RO containing a network-connectivity constraint which has sub-elements, namely, .errcount, .hostaddr, and .period.

As illustrated in FIG. 4A, a network connectivity element (or parameter) is added to a constraint element. As illustrated in FIG. 4B, in case that a network-connectivity constraint (or item) is resident in an XML instance constraint element (or item) of the RO, a particular device (e.g., the second device) having received the RO analyzes the network-connectivity constraint and sub-elements of the RO. That is, when the first device has issued to the second device the RO in the XML format as shown in FIGS. 4A and 4B, the second device analyzes a 'hostaddr' of the RO to attempt to access an address of a local RI (e.g., the first device). In case the access to the local RI (e.g., the first device) by the second device has continuously been failed as many times as set in an 'errcount', the second device deletes or disables the RO received from the first device. Here, the 'hostaddr' may be defined as a Uniform Resource Identifier (URI), for example, defined as a http address in a format of http://xxxx/xxx, and defined as a device ID such as 'Bluetooth:DEV10A56'. When the 'hostaddr' indicates the device ID, for example, the second device examines a network entity on a certain network (e.g., Bluetooth, an Internet, LAN, etc). As a result, if a device ID of a local RI (e.g., the first device) has not been detected sequentially more than the number of times set in the 'errcount', it is assumed that the network connection has been failed. As illustrated in FIG. 4B, if a 'period' is resident in the RO, a certain device (e.g., the second device) having received the RO should check 'network connectivity' by a time interval defined in the 'period'.

Hereinafter, protocols used when a first device temporarily shares its RO with a second device will be explained with reference to FIGS. 5 through 7. Here, entities illustrated in FIGS. 5 and 6 respectively denote a first device DRM agent and a second device DRM agent.

Figure 5:
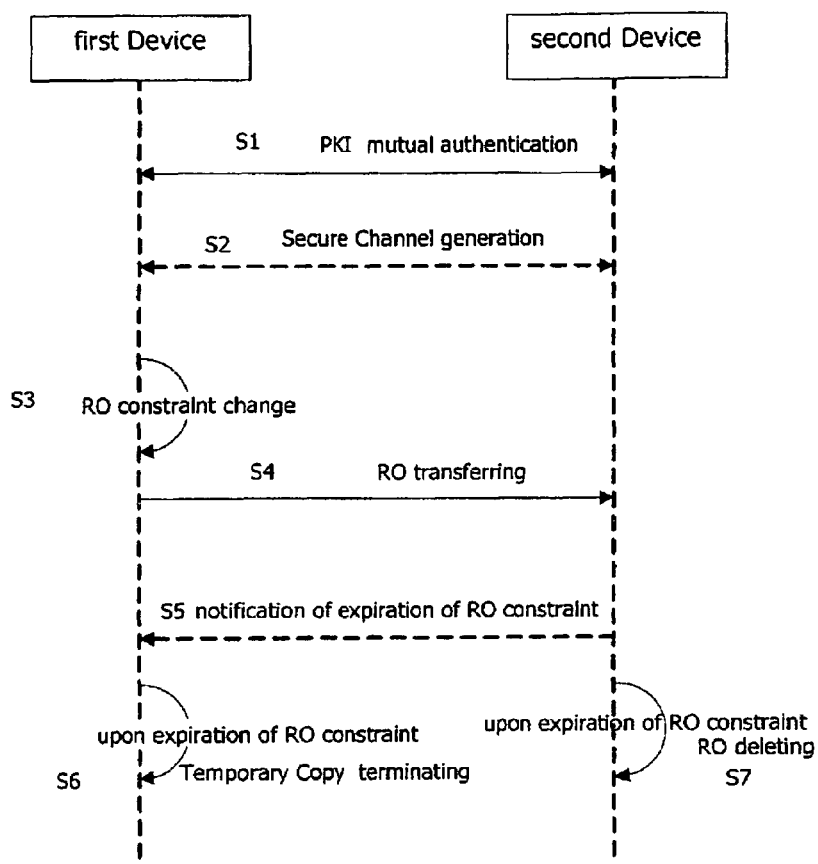
FIG. 5 is a signal flow chart showing a method for processing constraint of RO and thereafter transferring the RO in order to temporarily share RO between devices in accordance with a first embodiment of the present invention.

FIG. 5 is a signal flow chart illustrating a method for transferring RO by processing constraint of the RO to temporarily share the RO between devices, in accordance with a first embodiment of the present invention. That is, FIG. 5 shows the first method aforementioned, which illustrates that a first device processes its RO by attaching a certain constraint in the RO, and thereafter transfers the processed RO to one or more second devices. Also, the embodiment illustrated in FIG. 5 uses the RO illustrated in FIGS. 3A and 3B.

Referring to FIG. 5, a first device performs a Public Key Infrastructure mutual authentication (S1). Here, a public key of a second device is transferred to the first device. If necessary, a secure channel may be formed between the first and second devices (S2). A private key may be shared between the first and second devices to be used for their communication. In this case, the RO is transferred through the secure channel without encoding a CEK included in the RO.

The first device processes the RO issued from the RI (S3). That is, the first device, as illustrated in FIGS. 3A and 3B, creates or changes one or more constraints within the RO. For example, the first device to process the RO, as aforementioned, may change the value of 'count' to 2 from 1 (i.e., count=2), change the value of 'datetime' to 3 from 1, or create new constraint 'accumulated' or 'interval' to thereby set to 'one hour'.

The RO processed in the step S3 (i.e., the RO in which one or more constraints have been created or changed) is transferred to the second device (S4). Here, if the secure channel has been formed between the first and second devices through the step S2, the RO is transferred from the first device to the second device through the secure channel. Alternatively, if the secure channel has not been formed between the first and second devices, the RO is transferred from the first device to the second device through a non-secure channel.

Meanwhile, when the second device receives the processed RO through the step S4, the second device can access (i.e. consume) the corresponding DRM content employing the processed RO. Here, the second device may only employ the processed RO based upon the constraint of the RO. For example, if 'count', one of constraints included in the processed RO, has been set to 1 (i.e., count=1), the second device may employ the RO only one time.

As illustrated in FIG. 3B, if the RO resident in the first device has a 'concurrent', and, for example, if the 'concurrent' is set to '4', the RO (i.e., the RO resident in the first device) can temporarily be shared with four other devices at once. While doing so, in case the RO of the first device is transferred to the second devices through the step S4, the 'concurrent' shall be changed from '4' to '3'. In other words, after the step S4 performed, the first device can temporarily share the RO (i.e., the RO resident in the first device) with three other devices at once.

When the RO is expired by completely consuming it under constraints set in the RO (i.e., the RO processed by the constraint values) transferred from the first device, the second device can notify this to the first device (S5). Upon the expiration of the RO, the second device performs a temporary copy terminating process (S6). In the step S6, the first device allows the value of the 'concurrent' to be returned into '4' from '3'. Accordingly, the first device can temporarily share the RO simultaneously with four other devices.

Upon the expiration of the RO, the second device expires the RO (S7). Here, the expiration of the RO in the step S6 may denote deleting or disabling the RO.

Figure 6:
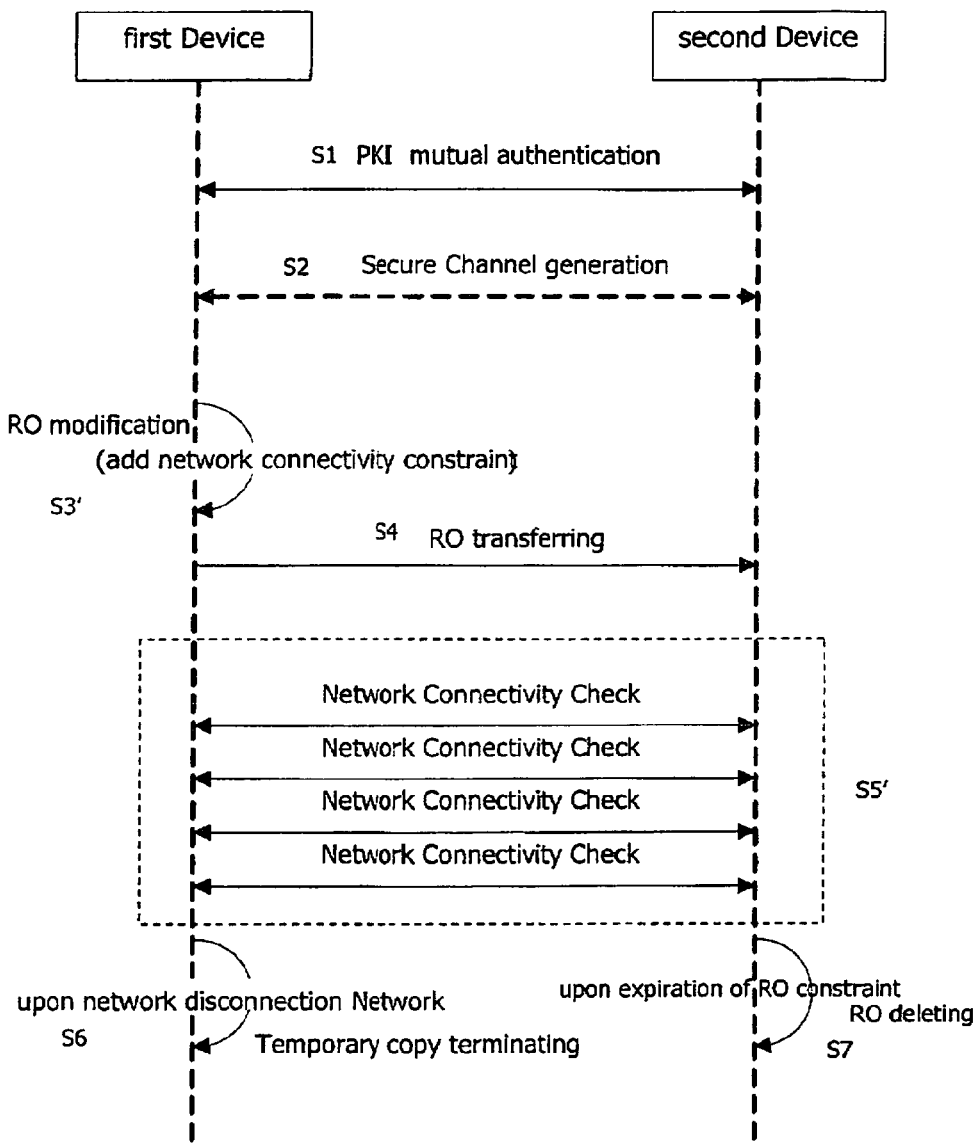
FIG. 6 is a signal flow chart showing a method for transferring RO in which a network-connectivity is included in order to temporarily share RO between devices in accordance with a second embodiment of the present invention.

FIG. 6 is a signal flow chart illustrating a method for transferring RO by including 'network-connectivity' within the RO to temporarily share the RO between devices, in accordance with a second embodiment of the present invention. In other words, FIG. 6 corresponds to the second method aforementioned, in which the first device processes the RO by further including 'network connectivity' constraint in the RO and then transfers the processed RO to the second device. Also, the embodiment of FIG. 6 employs the RO illustrated in FIGS. 4A and 4B. Here, regarding FIGS. 5 and 6, the same lo reference numerals have the same operations and functions as those of signals corresponding to the reference numerals. In order to easily explain the present invention, it is assumed that a value of an 'errcount' within the RO is set to 4 and a value of a 'hostaddr' denotes the first device (e.g., a value of the hostaddr attribute is set to a device ID of the first device).

As illustrated in FIG. 6, the PKI mutual authentication process (Si) and the secure channel generating process (S2) are performed as same as in FIG. 5. Hence, the S1 and S2 can be understood with reference to FIG. 5, and detailed explanation therefor will not be repeated accordingly.

The first device, as shown in FIGS. 4A and 4B, processes the RO by adding (attaching) 'network-connectivity' into the RO (S3'). The first device transfers to one or more second devices the processed RO, namely, the processed RO including the 'network-connectivity' constraint, and then temporarily shares the RO with the second devices (S4). Here, if a secure channel has been formed between the first device and the second devices through the step S2, the processed RO is transferred from the first device to the second device through the secure channel. On the other hand, if the secure channel has not been formed therebetween, the processed RO is then transferred from the first device to the second device through a non-secure channel.

The first and second devices periodically check a network connectivity therebetween (S5'). That is, the network connectivity between the first and second devices are periodically checked by a time interval set in the 'period' as illustrated in FIG. 4B. In case a value of an errcount has been set to 4, when the network connection between the first and second devices is disconnected sequentially four times (S5'), the first device terminates the temporary-share of the RO with the second device (i.e., performs the temporary copy terminating process mentioned in FIG. 6) (S6). After the step S5' performed, the second device expires the RO (S7). Here, the expiring the RO denotes to delete or disable the RO.

Figure 7:
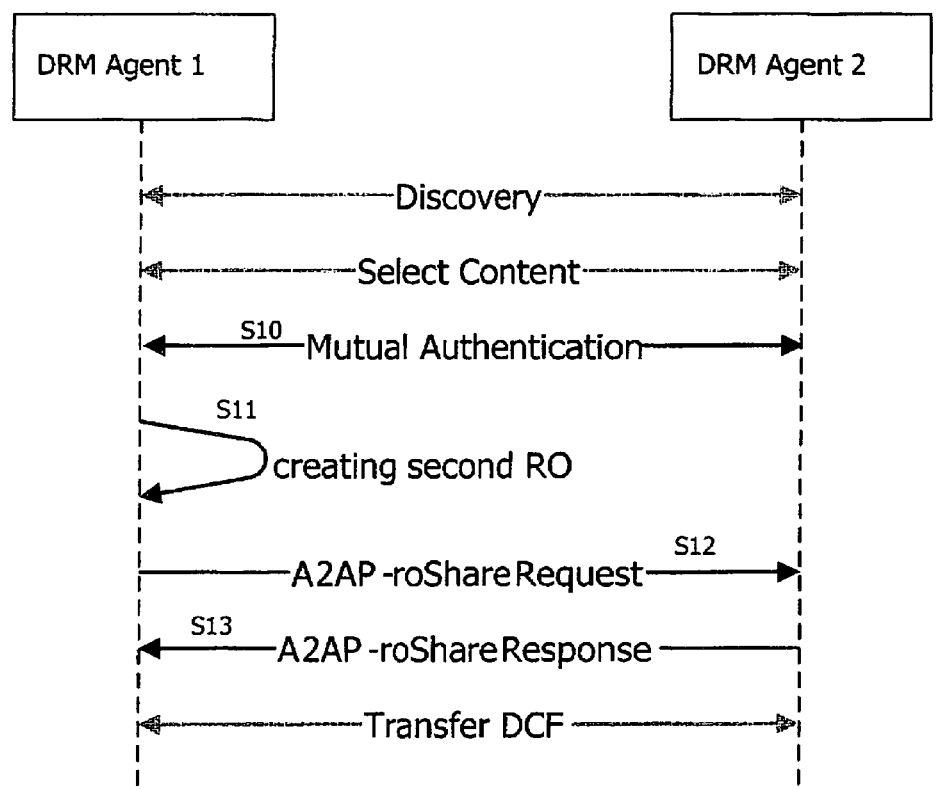
FIG. 7 is a signal flow chart showing a method for sharing RO between devices in accordance with a third embodiment of the present invention.

FIG. 7 is a signal flow chart illustrating a method for sharing RO between devices in accordance with a third embodiment of the present invention. Here, a DRM agent 1 and a DRM agent 2 in FIG. 7 correspond to the first device and the second device, respectively. Also, a signal for sharing the RO between the devices is transmitted through an A2AP-1 interface. Here, the A2AP-1 interface denotes a 2-way RO acquisition protocol for acquiring the RO between the DRM agents.

When a DRM agent 2 enters a certain network (e.g., a Bluetooth, etc) or domain in which a DRM agent 1 is currently positioned, the DRM agent 1 discovers the DRM agent 2 by using a discovery mechanism such as UPnP (specified as 'Discovery' in FIG. 7). Here, the discovery process according to the discovery mechanism may include a work of informing a capability for processing the temporary-share (or which is referred to as 'Ad Hoc Sharing') of the RO between the devices (i.e., the DRM agent 1 and the DRM agent 2). Each user of the DRM agent 1 and the DRM agent 2 selects a content to transfer (specified as 'Select Content' in FIG. 7).

Upon completing a mutual authentication between the DRM agents 1 and 2, a session is accordingly set between the DRM agent 1 and the DRM agent 2 (S10). The DRM agent 1 creates RO (referred to as a 'second RO' for reference) for the DRM agent 2 based upon RO (referred to as a 'first RO') which the DRM agent 1 is currently possessing (S11). Here, the first RO may be issued from the RI. The DRM agent 1, on the other hand, processes (or changes or modifies) the first RO to thereby create the second RO based upon a specific permission for a temporary-share or Ad Hoc sharing. Alternatively, the DRM agent 1 may processes the first RO to thereby create the second RO based on current state information with respect to the first RO. Here, the DRM agent 1 processes the first RO to create the second RO so that the second RO could include one of 'time-based constraint' and 'proximity-based constraint', or include both the constraints. For example, the DRM agent 1 may create a second RO in which '<datetime>' constraint, namely, a type of 'time-based constraint', is set to two hours.

The DRM agent 1 transfers the second RO to the DRM agent 2 using an A2AP protocol (S12 and S13). That is, the DRM agent 1 sends an A2AP-roShareRequest message including the second RO to the DRM agent 2 (S12). The DRM agent 2 processes the A2AP-roShareRequest message, and then sends back to the DRM agent 1 an A2AP-roShareResponse message in response to the A2AP-roShareRequest message (S13). The DRM agent 1 receives and processes the A2AP-roShareResponse message. Here, the DRM agent 1 may transfer to the DRM agent 2 a Digital Content Format (DCF) corresponding to a sharing RO (i.e. the second RO), and the transferring may be executed at a time of transferring the second RO or before or after transferring the second RO.

For example, the DRM agent 2 can consume the corresponding DRM content employing the second RO (e.g., the second RO in which <datetime> has been set to two hours) as the sharing RO. That is, assuming that the corresponding DRM content is a certain movie, a user of the DRM agent 2 can play the certain movie for two hours employing the second RO, and simultaneously a user of the DRM agent 1 can play the certain movie employing the first RO. That is, each user of the DRM agent 1 and the DRM agent 2 can simultaneously consume the DRM content (i.e. the certain movie) employing their owned ROs (i.e. the first RO and the second RO) to thereby embody temporary-sharing RO therebetween. However, the user of the DRM agent 1 may play the corresponding DRM content (i.e., the certain movie) using the first RO within a range which the RI has originally constrained.

It is assumed, on the other hand, that the second RO is created to include a proximity-based constraint (e.g., a network-connectivity) in the step S11, and the second RO is transferred from the DRM agent 1 to the DRM agent 1. Here, the DRM agent 2 can consume (or access) the corresponding DRM content, for example, a video, employing the second RO only when the DRM agent 2 is positioned within a network (e.g., the Bluetooth, etc) in which the DRM agent 2 can communicate with the DRM agent 1. Also, the DRM agent 1 can also consume (or access) the corresponding DRM content (e.g., the video, etc) employing the first RO. Here, the network denotes a certain area, for example, a banquet or a place holding a party in which a communication between the DRM agents is available within a network in proximity such as the Bluetooth. Here, if the DRM agent 2 moves away from the network (e.g., the place holding a party), the DRM agent 2 can not access the corresponding DRM content any more by using the second RO.

Thus, the embodiments of FIGS. 5 and 7 have been employed to explain the method in which the first device processes the RO issued from the RI and then transfers it to the second device so as to temporarily share the RO with the second device. However, it is also possible that the RI directly creates RO in a format capable of being temporarily shared with one or more different devices (e.g., the second devices) without the RO processing by the first device to thereafter provide (or issue) the RO to the first device, and then the first device can transfer the RO (i.e., the RO directly provided from the RI and formed in a temporarily sharable format) to the one or more different devices. In other words, an entity to create the temporarily sharable RO can be the RI as well as the first device.

Additionally, the second device receives the RO (i.e., the RO for a temporary share) from the first device, and can also receive the corresponding DRM content of the RO simultaneously with the RO, or before or after receiving the RO. Alternatively, the second device can receive the corresponding DRM content of the RO (i.e., the RO for the temporary sharing) directly from the RI or CI.

In a method for embodying a device according to the present invention, a device according to the present invention may separately include a module for receiving RO, and a module for checking(or verifying) whether information related to a right of modifying (or changing) the received RO is included in the RO.

As aforementioned, in order to share the RO for a DRM content between different devices, the RO has been processed to include a time-based constraint (e.g., 'count' or 'datetime') or include a proximity-based constraint (e.g., network-connectivity). If necessary, the RO can be processed to include both the time-based constraint and the proximity-based constraint.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

As described above, the present invention can process RO for a specific DRM content to transfer to at least one or more other devices.

The present invention can be embodied such that a plurality of devices can use the RO to simultaneously access the specific DRM content since the plurality of devices can temporarily share the RO for the specific DRM content based upon constraints of the processed(or created) RO for the specific DRM content.

Also, the present invention can effectively be implemented such that the plurality of devices can use the RO for the specific DRM content according to a certain time (e.g., 'datetime') or the number of times (e.g., 'count') under constraint (e.g,. a time-based constraint) set in the RO for the specific DRM content.

Additionally, the present invention can effectively be implemented such that the plurality of devices can use the RO for the specific DRM content within a range of a particular network (e.g., LAN or Bluetooth) according to constraint (e.g., a proximity-based constraint) set in the RO for the specific DRM content.

Hence, the present invention can effectively improve availability of the specific DRM content by allowing a sharing of the RO for the specific DRM content between devices.

The invention claimed is:

1. A method for sharing Rights Object (RO) of a Digital Rights Management (DRM) content to simultaneously consume the DRM content between devices and to manage a number of devices which are sharing the RO, the method comprising:
(a) performing a mutual authentication between a first device and at least one second device to set a session therebetween;
(b) processing, by the first device, an RO of the first device to temporarily share the RO with the at least one second device and to manage a number of the at least one second device which are sharing the RO of the first device, wherein a maximum number of the at least one second device is determined based on a concurrent element, wherein the processing the RO of the first device further includes creating at least one RO which includes a network connectivity constraint specifying whether a RO is capable of being shared when the at least one second device is in a connected state with a certain network, and wherein the processing the RO further includes creating the at least one RO to include a constraint indicating a minimum number of count to be capable of temporarily sharing the created at least one RO; and
(c) transferring the created at least one RO from the first device to the at least one second device through a particular interface.

2. The method of claim 1, wherein the at least one RO is created based upon the RO processed by the first device and permission for the sharing.

3. The method of claim 2, wherein the permission for the sharing is provided from a Rights Issuer (RI) to the first device.

4. The method of claim 1, wherein the at least one RO is created based upon status information on the RO.

5. The method of claim 1, wherein the concurrent element indicates the maximum number of the at least one second device which can simultaneously consume the at least one RO to temporarily share the RO with the first device for a certain time.

6. The method of claim 1, wherein the created at least one RO further includes a time-based constraint including at least one of a 'count' element to be set to a minimum number of times of consuming the created at least one RO, a 'datetime' element, an 'accumulated' element and an 'interval' element, and
wherein the 'datetime' element, the 'accumulated' element and the 'interval' element are set to limit a time to use the created at least one RO.

7. The method of claim 1, wherein the particular interface is an Agent to Agent Protocol-1 (A2AP-1).

8. The method of claim 1, wherein the step (c) comprises:
sending an A2AP-roShareRequest message from the first device to the at least one second device;
processing the A2AP-roShareRequest message in the at least one second device to thereafter send an A2AP-roShareResponse message to the first device; and
processing the A2AP-roShareResponse message in the first device.

9. The method of claim 8, wherein the A2AP-roShareRequest message includes the at least one RO created by the first device.

10. The method of claim 1, further comprising:
accessing a specific DRM content as the first device employs the RO resident in the first device itself and the at least one second device employs the at least one RO created by the first device, and thereby simultaneously consuming the specific DRM content in both the first device and the at least one second device.

11. The method of claim 10, wherein the at least one second device consumes the specific DRM content with the at least one RO created by the first device for a certain time set by a <datetime> constraint in the at least one RO created by the first device when the at least one RO created by the first device includes the <datetime> constraint as the time-based constraint.

12. The method of claim 10, wherein the at least one second device is not allowed to use the created at least one RO when the at least one RO includes the proximity-based constraint and the at least one second device is not in proximity of a certain area.

13. The method of claim 12, wherein the certain area is an area in which the first device and the at least one second device are so proximate that a communication therebetween is available over a certain network.

14. A method for sharing Rights Object (RO) of a Digital Rights Management (DRM) content to simultaneously consume the DRM content between devices and to manage a number of devices which are sharing the RO, the method comprising:
creating, by a first device, at least one RO to manage a number of the at least one second device which are sharing the RO based upon a RO which a Rights Issuer (RI) or another device has issued to the first device, wherein the at least one RO is created by adding at least one of a concurrent element indicating a maximum number of the at least one second device which can simultaneously consume the at least one RO to temporarily share the RO with the first device for a certain time, and a network connectivity constraint specifying whether a RO is capable of being shared when the at least one second device is in a connected state with a certain network;
transferring the created at least one RO from the first device to the one or more second devices; and
temporarily sharing the RO between the first device and the second device.

15. The method of claim 14, wherein the first RO includes temporary-share permission with respect to RO sharing between the first device and the one or more second devices.

16. The method of claim 15, wherein the temporary-share permission has one or more sub-elements, the one or more sub-elements including a constraint, a permission, a concurrent and a hostdevID, and
wherein the hostdevID includes an attribute with respect to a right of whether the first device is able to process the created at least one RO.

17. The method of claim 14, wherein
the network-connectivity constraint has one or more sub-elements, the one or more sub-elements including an errcount, a hostaddr and a period.

18. The method of claim 14, further comprising, upon an expiration of the created at least one RO:
notifying, by the one or more second devices, the expiration of the created at least one RO to the first device; or
deleting or disabling the created at least one RO by the one or more second devices.

19. The method of claim 18, wherein the notifying, by the one or more second devices, the expiration of the created at least one RO to the first device further comprises:
terminating the sharing of the created at least one RO between the first device and the one or more second devices after the first device receives the notification of the created at least one or more RO expiration from the one or more second devices.

* * * * *